(12) United States Patent
Bewersdorf et al.

(10) Patent No.: US 7,880,149 B2
(45) Date of Patent: Feb. 1, 2011

(54) 3D BIPLANE MICROSCOPY

(75) Inventors: Joerg Bewersdorf, Bar Harbor, ME (US); Manuel F. Juette, Rosrath (DE); Travis Gould, Old Town, ME (US); Sam T. Hess, Stillwater, ME (US)

(73) Assignees: The Jackson Laboratory, Bar Harbor, ME (US); University of Maine, Orono, ME (US)

( * ) Notice: Subject to any disclaimer, the term of this patent is extended or adjusted under 35 U.S.C. 154(b) by 0 days.

(21) Appl. No.: 12/826,422

(22) Filed: Jun. 29, 2010

(65) Prior Publication Data
US 2010/0265318 A1 Oct. 21, 2010

Related U.S. Application Data

(63) Continuation of application No. 12/060,730, filed on Apr. 1, 2008, now Pat. No. 7,772,569.

(51) Int. Cl.
*G01J 1/58* (2006.01)
*G02B 21/06* (2006.01)
(52) U.S. Cl. .................. 250/458.1; 250/459.1; 359/368
(58) Field of Classification Search .............. 250/458.1, 250/459.1; 356/317; 359/368, 385
See application file for complete search history.

(56) References Cited

U.S. PATENT DOCUMENTS

| | | | |
|---|---|---|---|
| 4,621,911 A | 11/1986 | Lanni et al. | 350/524 |
| 4,748,980 A | 6/1988 | Cremer et al. | 128/303.1 |
| 5,731,588 A | 3/1998 | Hell et al. | 250/458.1 |
| 5,777,732 A | 7/1998 | Hanninen et al. | 356/318 |
| 5,851,052 A | 12/1998 | Gustafsson | 297/16.2 |
| 5,874,726 A | 2/1999 | Haydon | 250/201.1 |

(Continued)

FOREIGN PATENT DOCUMENTS

EP 0 491 289 6/1992

(Continued)

OTHER PUBLICATIONS

Jeff Gelles, Bruce J. Schnapp, & Michael P. Sheetz, *Tracking Kinesin-Driven Movements With Nanometre-Scale Precision*, 331 Nature, 450-453 (Feb. 4, 1988) (4 pages).

(Continued)

*Primary Examiner*—David P Porta
*Assistant Examiner*—Mark R Gaworecki
(74) *Attorney, Agent, or Firm*—Nixon Peabody LLP (57) ABSTRACT

A microscopy system is configured for creating 3D images from individually localized probe molecules. The microscopy system includes a sample stage, an activation light source, a readout light source, a beam splitting device, at least one camera, and a controller. The activation light source activates probes of at least one probe subset of photo-sensitive luminescent probes, and the readout light source causes luminescence light from the activated probes. The beam splitting device splits the luminescence light into at least two paths to create at least two detection planes that correspond to the same or different number of object planes of the sample. The camera detects simultaneously the at least two detection planes, the number of object planes being represented in the camera by the same number of recorded regions of interest. The controller is programmable to combine a signal from the regions of interest into a 3D data.

17 Claims, 7 Drawing Sheets

U.S. PATENT DOCUMENTS

| | | | |
|---|---|---|---|
| 5,888,734 A | 3/1999 | Cremer et al. | 435/6 |
| 5,922,543 A | 7/1999 | Cremer | 435/6 |
| 6,005,916 A | 12/1999 | Johnson et al. | 378/87 |
| 6,135,557 A | 10/2000 | Gustafsson | 297/344.18 |
| 6,210,977 B1 | 4/2001 | Sieben et al. | 436/518 |
| 6,262,423 B1 | 7/2001 | Hell et al. | 250/458.1 |
| 6,337,472 B1 | 1/2002 | Garner et al. | 250/201.3 |
| 6,424,421 B1 | 7/2002 | Cremer et al. | 356/620 |
| 6,608,717 B1 | 8/2003 | Medford et al. | 359/368 |
| RE38,307 E | 11/2003 | Gustafsson et al. | 359/385 |
| 6,804,385 B2 | 10/2004 | Eisfeld et al. | 382/128 |
| 6,909,105 B1 | 6/2005 | Heintzmann et al. | 250/599.04 |
| 6,934,079 B2 | 8/2005 | Hell et al. | 359/368 |
| 7,009,700 B2 | 3/2006 | Dubois et al. | 356/317 |
| 7,064,824 B2 | 6/2006 | Hell | 356/317 |
| 7,105,795 B2 | 9/2006 | Cartlidge et al. | 250/208.1 |
| 7,115,885 B2 | 10/2006 | Hell | 250/459.1 |
| 7,151,246 B2 | 12/2006 | Fein et al. | 250/208.1 |
| 7,154,598 B2 | 12/2006 | Montagu et al. | 356/244 |
| 7,253,408 B2 | 8/2007 | West | 250/309 |
| 7,253,893 B2 | 8/2007 | Hell et al. | 356/317 |
| 7,256,894 B2 | 8/2007 | Chen et al. | 356/497 |
| 7,298,461 B2 | 11/2007 | Cremer et al. | 356/73 |
| 7,535,012 B2 | 5/2009 | Betzig et al. | 250/458.1 |
| 2002/0023979 A1 | 2/2002 | Gustafsson | 242/290 |
| 2002/0030811 A1 | 3/2002 | Schindler | 356/318 |
| 2002/0064789 A1 | 5/2002 | Weiss et al. | 435/6 |
| 2002/0076200 A1 | 6/2002 | Hamaguchi et al. | 386/69 |
| 2002/0101593 A1 | 8/2002 | Yang et al. | 356/484 |
| 2004/0114138 A1 | 6/2004 | Hell | 365/318 |
| 2004/0133112 A1 | 7/2004 | Rajadhyaksha | 600/476 |
| 2004/0207854 A1 | 10/2004 | Hell et al. | 356/450 |
| 2004/0212799 A1 | 10/2004 | Hell | 356/317 |
| 2005/0036667 A1 | 2/2005 | So et al. | 382/128 |
| 2005/0094261 A1 | 5/2005 | Hell et al. | 359/368 |
| 2005/0238118 A1 | 10/2005 | Asraf et al. | 375/316 |
| 2005/0259008 A1 | 11/2005 | Gustafsson | 343/700 MS |
| 2006/0012870 A1 | 1/2006 | Engelmann et al. | 359/385 |
| 2006/0013492 A1 | 1/2006 | Hecht et al. | 382/232 |
| 2006/0038993 A1 | 2/2006 | Hell | 356/318 |
| 2006/0044985 A1 | 3/2006 | Hell | 369/100 |
| 2006/0050146 A1 | 3/2006 | Richardson | 348/80 |
| 2006/0171846 A1 | 8/2006 | Marr et al. | 422/82.11 |
| 2006/0187974 A1 | 8/2006 | Dantus | 372/9 |
| 2006/0256338 A1 | 11/2006 | Gratton et al. | 356/417 |
| 2007/0047287 A1 | 3/2007 | Hell et al. | 365/129 |
| 2007/0053594 A1 | 3/2007 | Hecht et al. | 382/232 |
| 2007/0065936 A1 | 3/2007 | Hasegawa et al. | 435/288.7 |
| 2007/0069940 A1 | 3/2007 | Gustafsson | 342/1 |
| 2007/0109555 A1 | 5/2007 | Gustafsson et al. | 356/517 |
| 2007/0160175 A1 | 7/2007 | Lang | 376/103 |
| 2008/0070323 A1 | 3/2008 | Hess et al. | 436/514 |
| 2008/0158551 A1 | 7/2008 | Hess et al. | 356/73 |
| 2008/0289966 A1 | 11/2008 | Voldman et al. | 204/643 |
| 2008/0312540 A1 | 12/2008 | Ntziachristos | 600/478 |
| 2009/0206251 A1 | 8/2009 | Hess et al. | 250/307 |
| 2009/0237501 A1 | 9/2009 | Lemmer et al. | 348/79 |

FOREIGN PATENT DOCUMENTS

| | | |
|---|---|---|
| EP | 0 500 673 A1 | 9/1992 |
| EP | 0 523 157 A1 | 1/1993 |
| EP | 0 491 289 B1 | 4/1996 |
| EP | 0 783 428 A1 | 7/1997 |
| EP | 0 898 783 A2 | 3/1999 |
| EP | 0 898 783 B1 | 3/1999 |
| EP | 0 946 855 B1 | 10/1999 |
| EP | 0 996 854 A1 | 5/2000 |
| EP | 1 008 845 A1 | 6/2000 |
| EP | 1 024 731 A1 | 8/2000 |
| EP | 1 157 297 B1 | 11/2001 |
| EP | 1 166 629 A1 | 1/2002 |
| EP | 1 359 452 A1 | 11/2003 |
| EP | 1 359 452 B1 | 11/2003 |
| EP | 1 377 816 A1 | 1/2004 |
| EP | 1 436 597 A1 | 7/2004 |
| EP | 1 444 503 B1 | 8/2004 |
| EP | 1 500 202 A1 | 1/2005 |
| EP | 1 616 216 A2 | 1/2006 |
| EP | 1 616 344 A2 | 1/2006 |
| EP | 1 676 121 A1 | 7/2006 |
| EP | 1 756 910 A1 | 2/2007 |
| GB | 2 416 261 A | 1/2006 |
| JP | 2006-084960 | 3/2006 |
| WO | WO 91/06220 A1 | 5/1991 |
| WO | WO 91/15547 A1 | 10/1991 |
| WO | WO 95/21393 A2 | 8/1995 |
| WO | WO 95/21393 A3 | 8/1995 |
| WO | WO 95/30166 A1 | 11/1995 |
| WO | WO 96/06003 A1 | 2/1996 |
| WO | WO 98/28592 A1 | 7/1998 |
| WO | WO 98/28775 A2 | 7/1998 |
| WO | WO 98/28775 A3 | 7/1998 |
| WO | WO 98/37231 A1 | 8/1998 |
| WO | WO 99/02974 | 1/1999 |
| WO | WO 99/02974 A1 | 1/1999 |
| WO | WO 99/20156 A1 | 4/1999 |
| WO | WO 00/33608 A2 | 6/2000 |
| WO | WO 00/35317 A1 | 6/2000 |
| WO | WO 00/52512 A1 | 9/2000 |
| WO | WO 02/05446 A1 | 1/2002 |
| WO | WO 02/084265 A1 | 10/2002 |
| WO | WO 03/040706 A1 | 5/2003 |
| WO | WO 03/093892 A1 | 11/2003 |
| WO | WO 03/094372 A1 | 11/2003 |
| WO | WO 2004/090617 A2 | 1/2004 |
| WO | WO 2004/090617 A3 | 1/2004 |
| WO | WO 2004/090950 A2 | 10/2004 |
| WO | WO 2004/090950 A3 | 10/2004 |
| WO | WO 2005/006849 A1 | 1/2005 |
| WO | WO 2005/033679 A1 | 4/2005 |
| WO | WO 2005/093391 A1 | 10/2005 |
| WO | WO 2005/114784 A1 | 12/2005 |
| WO | WO 2006/091162 A1 | 8/2006 |
| WO | WO 2006/100013 A2 | 9/2006 |
| WO | WO/2006/100013 A3 | 9/2006 |
| WO | WO 2006/103025 A1 | 10/2006 |
| WO | WO 2006/114247 A1 | 11/2006 |
| WO | WO 2006/118508 A1 | 11/2006 |
| WO | WO 2006/127692 A2 | 11/2006 |
| WO | WO 2007/064285 A1 | 6/2007 |
| WO | WO 2007/073266 A1 | 6/2007 |
| WO | WO 2007/110126 A1 | 10/2007 |

OTHER PUBLICATIONS

Winfried Denk, James H. Strickler, & Watt. W. Webb, *Two-Photon Laser Scanning Fluorescence Microscopy*, 248 Science, 73-76 (Apr. 6, 1990) (2 pages).

S. Hell & E. H. K. Stelzer, *Fundamental Improvement of Resolution With a 4Pi-Confocal Fluorescence Microscope Using Two-Photon Excitation*, 93 Opt. Comm., 277-282 (1992) (6 pages).

H. Pin Kao & A. S. Verkman, *Tracking of Single Fluorescent Particles in Three Dimensions: Use of Cylindrical Optics to Encode Particle Position*, 67 Biophysical Journal, 1291-1300 (Sep. 1994) (10 pages).

Jörg Bewersdorf, Rainer Pick, Stefan W. Hell, *Multifocal Multiphoton Microscopy*. Optics Letters, vol. 23 No. 9, 655-657 (May 1, 1998) (3 pages).

M. G. L. Gustafsson, D.A. Agard, & J. W. Sedat, *I⁵M: 3D Widefield Light Microscopy With Better Than 100 nm Axial Resolution*, 195 Journal of Microscopy, 10-16 (Jul. 1999) (7 pages).

D. Zenisek, J. A. Steyer, W. Almers, *Transport, Capture and Exocytosis of Single Synaptic Vesicles at Active Zones*. Nature, vol. 406, 849-854 (Aug. 24, 2000) (6 pages).

Scot C. Kuo, *Using Optics to Measure Biological Forces and Mechanics*. Traffic 2(11), pp. 757-763 (2001) (7 pages).

Gregory S. Harms, Laurent Cognet, Piet H. M. Lommerse, Gerhard A. Blab, & Thomas Schmidt, *Autofluorescent Proteins in Single-Molecule Research: Applications to Live Cell Imaging Microscopy*, 80 Biophysical Journal, 2396-2408 (May 2001) (13 pages).

Eric O. Potma, Wim P. de Boeij, Leonard Bosgraaf, Jeroen Roelofs, Peter J. M. van Haastert, & Douwe A. Wiersma, *Reduced Protein Diffusion Rate by Cytoskeleton in Vegetative and Polarized Dictyostelium Cells*, 81 Biophysical Journal, 2010-2019 (Oct. 2001) (10 pages).

Russell E. Thompson, Daniel R. Larson, & Watt W. Webb, *Precise Nanometer Localization Analysis for Individual Fluorescent Probes*, 82 Biophysical Journal, 2775-2783 (May 2002) (9 pages).

George H. Patterson & Jennifer Lippincott-Schwartz, *A Photoactivatable GFP for Selective Photolabeling of Proteins and Cells*, 297 Science, 1873-1877 (Sep. 13, 2002) (5 pages).

Ahmet Yildiz, Michio Tomishige, Ronald D. Vale, & Paul R. Selvin, *Kinesin Walks Hand-Over-Hand*, 303 Science, 676-678 (Jan. 30, 2004) (3 pages).

Kotono Murase, Takahiro Fujiwara, Yasuhiro Umemura,, Kenichi Suzuki, Ryota Iino, Hidetoshi Yamashita, Mihoko Saito, Hideji Murakoshi, Ken Ritchie, & Akihiro Kusumi, *Ultrafine Membrane Compartments for Molecular Diffusion as Revealed by Single Molecule Techniques*, 86 Biophysical Journal, 4075-4093 (Jun. 2004) (19 pages).

Dmitriy M. Chudakov, Vladislav V. Verkhusha, Dmitry B. Staroverov, Ekaterina A. Souslova, Sergey Lukyanov, Konstantin A. Lukyanov, *Photoswitchable Cyan Fluorescent Protein for Protein Tracking*, Nature Biotechnology, vol. 22, No. 11, 1435-1439 (Nov. 2004) (5 pages).

Hilmar Gugel, Jörg Bewersdorf, Stefan Jakobs, Johann Engelhardt, Rafael Storz, & Stefan W. Hell, *Cooperative 4Pi Excitation and Detection Yields Sevenfold Sharper Optical Sections in Live-Cell Microscopy*, 87 Biophysical Journal, 4146-4152 (Dec. 2004) (7 pages).

Ken Ritchie, Xiao-Yuan Shan, Junko Kondo, Kokoro Iwasawa, Takahiro Fujiwara, & Akihiro Kusumi, *Detection of Non-Brownian Diffusion in the Cell Membrane in Single Molecule Tracking*, 88 Biophysical Journal, 2266-2277 (Mar. 2005) (12 pages).

Valeria Levi, QiaoQiao Ruan, & Enrico Gratton, *3-D Particle Tracking in a Two-Photon Microscope: Application to the Study of Molecular Dynamics in Cells*, 88 Biophysical Journal, 2919-2928 (Apr. 2005) (10 pages).

Matthias Fricke, Tim Nielsen, *Two-Dimensional Imaging Without Scanning by Multifocal Multiphoton Microscopy*, Applied Optics, vol. 44, No. 15, 2984-2988 (May 20, 2005) (5 pages).

Comert Kural, Hwajin Kim, Sheyum Syed, Gohta Goshima, Vladimir I. Gelfand, & Paul R. Selvin, *Kinesin and Dynein Move a Peroxisome in Vivo: A Tug-of-War or Coordinated Movement*, 308 Science, 1469-1472 (Jun. 3, 2005) (4 pages).

Marc Schneider, Sara Barozzi, Ilaria Testa, Mario Faretta, & Alberto Diaspro, *Two-Photon Activation and Excitation Properties of PA-GFP in the 720-920-nm Region*, 89 Biophysical Journal, 1346-1352 (Aug. 2005) (7 pages).

Valeria Levi, Anna S. Serpinskaya, Enrico Gratton, & Vladimir I. Gelfand, *Organelle Transport Along Microtubules in Xenopus Melanophores: Evidence for Cooperation Between Multiple Motors*, Biophys J BioFAST (Oct. 7, 2005) (27 pages).

Valeria Levi, Vladimir I. Gelfand, Anna S. Serpinskaya, & Enrico Gratton, *Melanosomes Transported by Myosin-V in Xenopus Melanophores Perform Slow 35 nm Steps*, Biophysical Journal: Biophysical Letters, L07-L09 (Oct. 27, 2005) (3 pages).

Konstantin A. Lukyanov, Dmitry M. Chudakov, Sergey Lukyanov, Vladislav V. Verkhusha, Innovation: *Photoactivatable Fluorescent Proteins*, Nature Reviews, Molecular Cell Biology, vol. 6, No. 11, 8858-91 (Nov. 2005) (7 pages).

Valeria Levi, QiaoQiao Ruan, Matthew Plutz, Andrew S. Belmont, & Enrico Gratton, *Chromatin Dynamics in Interphase Cells Revealed by Tracking in a Two-Photon Excitation Microscope*, 89 Biophysical Journal, 4275-4285 (Dec. 2005) (11 pages).

Prashant Prabhat, Sripad Ram, E. Sally Ward, & Raimund J. Ober, *Simultaneous Imaging of Several Focal Planes in Fluorescence Microscopy for the Study of Cellular Dynamics in 3D*, 6090 Proc. Of SPIE, (2006) (7 pages).

Rebecca Medda, Stefan Jacobs, Stefan W. Hell, Jörg Bewersdorf: *4Pi Microscopy Of Quantum Dot-Labeled Cellular Structures*, Journal of Structural Biology, 156, 517-523 (2006) (7 pages).

Katrin I. Willig, Silvio Rizzoli, Volker Westphal, Reinhard Jahn, Stefan W. Hell, *STED Microscopy Reveals That Synaptotagmin Remains Clustered After Synaptic Vesicle Exocytosis*. Nature, vol. 440, 935-939 (Apr. 13, 2006) (5 pages).

Erdal Toprak, Joerg Enderlein, Sheyum Syed, Sean A. McKinney, Rolfe G. Petschek, Taekjip Ha, Yale E. Goldman, & Paul R. Selvin, *Defocused Orientation and Position Imaging (DOPI) of Myosin V*, 103 PNAS, (Apr. 25, 2006) (6 pages).

J. Bewersdorf, R. Schmidt, & S. W. Hell, *Comparison of $I^5M$ and 4Pi-Microscopy*, 222 Journal of Microscopy, 105-117 (May 2006) (10 pages).

Michael J. Rust, Mark Bates, & Xiaowei Zhuang, *Sub-Diffraction-Limit Imaging by Stochastic Optical Reconstruction Microscopy (STORM)*, Nature Methods / Advance Online Publication (Aug. 9, 2006) (3 pages).

Jörg Enderlein, Erdal Toprak, & Paul R. Selvin, *Polarization Effect on Position Accuracy of Fluorophore Localization*, 14 Optics Express, 8111-8120 (Sep. 4, 2006) (10 pages).

Eric Betzig, George H. Patterson, Rachid Sougrat, O. Wolf Lindwasser, Scott Olenych, Juan S. Bonifacino, Michael W. Davidson, Jennifer Lippincott-Schwartz, & Harald F. Hess, *Imaging Intracellular Fluorescent Proteins at Nanometer Resolution*, 313 Science, 1642-1645 (Sep. 15, 2006) (4 pages).

Ivan Rasnik, Sean A. McKinney, & Taekjip Ha, *Nonblinking and Long-Lasting Single-Molecule Fluorescence Imaging*, Nature Methods / Advance Online Publication (Oct. 1, 2006) (3 pages).

Jörg Bewersdorf, Brian T. Bennett, & Kendall L. Knight, *H2AX Chromatin Structures and Their Response to DNA Damage Revealed by 4Pi Microscopy*, 103 PNAS, 18137-18142 (Nov. 28, 2006) (3 pages).

Samuel T. Hess, Thanu P. K. Girirajan, & Michael D. Mason, *Ultra-High Resolution Imaging by Fluorescence Photoactivation Localization Microscopy*, 91 Biophysical Journal, 4258-4272 (Dec. 2006) (15 pages).

J. Fölling, V. Belov, R. Kunetsky, R. Medda, A. Schönle, A. Egner, C. Eggeling, M. Bossi, and S. W. Hell: *Photochromic Rhodamines Provide Naonscopy With Optical Sectioning*, Angew. Chem. Int. Ed. 6266-6270 (2007) (5 pages).

Prashant Prabhat, Zhuo Gan, Jerry Chao, Sripad Ram, Carlos Vaccaro, Steven Gibbons, Raimund J. Ober, & E. Sally Ward, *Elucidation of Intracellular Recycling Pathways Leading to Exocytosis of the Fc Receptor, FcRn, by Using Multifocal Plane Microscopy*, PNAS (Mar. 23, 2007) (7 pages).

C. Geisler, A. Schönle, C. von Middendorff, H. Bock, C. Eggeling, A. Egner, & S.W. Hell, *Resolution of λ/10 in Fluorescence Microscopy Using Fast Single Molecule Photo-Switching*, 88 Applied Physics A, 223-226 (Jun. 1, 2007) (4 pages).

H. Bock, C. Geisler, C.A. Wurm, C. Von Middendorff, S. Jakobs, A Schönle, A. Egner, S.W. Hell, & C. Eggeling, *Two-Color Far-Field Fluorescence Nanoscopy Based on Photoswitchable Emitters*, 88 Applied Physics B, 161-165(Jul. 6, 2007) (5 pages).

J. Fölling, V. Belov, R. Kunetsky, R. Medda, A. Schönle, A. Egner, C. Eggerling, M. Bossi, & S.W. Hell, *Photochromic Rhodamines Provide Nanoscopy With Optical Sectioning*, Angewandte Chemie (Jul. 19, 2007) (7 pages).

Mark Bates, Bo Huang, Graham T. Dempsey, & Xiaowei Zhuang, *Multicolor Super-Resolution Imaging With Photo-Switchable Fluorescent Probes*, 317 Science, 1749-1753 (Sep. 21, 2007) (6 pages).

Samuel T. Hess, Travis J. Gould, Manasa V. Gudheti, Sarah A. Maas, Kevin D. Mills, & Joshua Zimmerberg, *Dynamic Clustered Distribution of Hemagglutinin Resolved at 40 nm in Living Cell Membranes Discriminates Between Raft Theories*, 104 PNAS, 17370-17375 (Oct. 30, 2007) (6 pages).

Alexander Egner, Claudia Geisler, Claas von Middendorff, Hannes Bock, Dirk Wenzel, Rebecca Medda, Martin Andresen, Andre C. Stiel, Stefan Jakobs, Christian Eggeling, Andreas Schönle, & Stefan W. Hell, *Fluorescence Nanoscopy in Whole Cells by Asynchronous Localization of Photoswitching Emitters*, 93 Biophysical Journal, 3285-3290 (Nov. 2007) (6 pages).

Manuel F. Juette, Travis Gould, Mark D. Lessard, Michael J. Mlodzianoski, Bhupendra S. Nagpure, Samuel T. Hess, Joerg Bewersdorf, *3D sub-100 nm Resolution by Biplane Fluorescence Photoactivation Localization Microscopy* (May 11, 2008) (10 pages).

PCT International Search Report for International Application No. PCT/US2009/038799 dated Nov. 5, 2009 (3 pages).

PCT International Written Opinion for International Application No. PCT/US2009/038799 dated Nov. 5, 2009 (3 pages).

3D BIPLANE MICROSCOPY

CROSS-REFERENCE TO RELATED APPLICATIONS

This application is a continuation of U.S. patent application Ser. No. 12/060,730, titled "3D Biplane Microscopy" and filed on Apr. 1, 2008 now U.S. Pat. No. 7,772,569, which is incorporated herein in its entirety.

FIELD OF THE INVENTION

The present invention relates generally to microscopic imaging and, more specifically, to three-dimensional ("3D") sub-100 nanometer resolution by biplane microscope imaging.

BACKGROUND OF THE INVENTION

Until about a decade ago, resolution in far-field light microscopy was thought to be limited to ~200-250 nanometers in the focal plane, concealing details of sub-cellular structures and constraining its biological applications. Breaking this diffraction bather by the seminal concept of stimulated emission depletion ("STED") microscopy has made it possible to image biological systems at the nanoscale with light. Additional details are provided in an article titled "Far-Field Optical Nanoscopy by Stefan W. Hell (316 Science, 1153-1158, May 25, 2007), which is incorporated herein by reference in its entirety. STED microscopy and other members of reversible saturable optical fluorescence transitions ("RESOLFT") family achieve a resolution >10-fold beyond the diffraction barrier by engineering the microscope's point-spread function ("PSF") through optically saturable transitions of the (fluorescent) probe molecules.

Lately, an emerging group of localization-based techniques has obtained similar resolution in the lateral plane. This group includes fluorescence photoactivation localization microscopy ("FPALM"), photoactivation localization microscopy ("PALM"), stochastic optical reconstruction microscopy ("STORM"), and PALM with independently running acquisition ("PALMIRA"). FPALM is described in more detail in an article titled "Ultra-High Resolution Imaging by Fluorescence Photoactivation Localization Microscopy" by Samuel T. Hess et al. (91 Biophysical Journal, 4258-4272, December 2006), which is incorporated herein by reference in its entirety. PALM is described in more detail in an article titled "Imaging Intracellular Fluorescent Proteins at Nanometer Resolution" by Eric Betzig et al. (313 Science, 1642-1645, Sep. 15, 2006), which is incorporated herein by reference in its entirety. STORM is described in more detail in an article titled "Sub-Diffraction-Limit Imaging by Stochastic Optical Reconstruction Microscopy" by Michael J. Rust et al. (Nature Methods/Advance Online Publication, Aug. 9, 2006), which is incorporated herein by reference in its entirety. PALMIRA is described in more detail in an article titled "Resolution of λ/10 in Fluorescence Microscopy Using Fast Single Molecule Photo-Switching" by H. Bock et al. (88 Applied Physics A, 223-226, Jun. 1, 2007), and an article titled "Photochromic Rhodamines Provide Nanoscopy With Optical Sectioning" by J. Folling et al. (Angew. Chem. Int. Ed., 46, 6266-6270, 2007), each of which is incorporated herein by reference in its entirety. As referred to in the current application, the term photo-sensitive refers to both photo-activatable (e.g., switching probes between an on state and an off state) and photo-switching (e.g., switching between a first color and a second color).

While utilizing similar optical switching mechanisms, this latter group of microscopes circumvents the diffraction limit by basing resolution improvement on the precise localization of spatially well-separated fluorescent molecules, a method previously used to track, for example, conventionally labeled myosin V molecules with 1.5 nanometers localization accuracy. This method is described in more detail in an article titled "Myosin V Walks Hand-Over-Hand: Single Fluorophore Imaging With 1.5-nanometers Localization" by Ahmet Yildiz et al. (300 Science, 2061-2065, Jun. 27, 2003), which is incorporated herein by reference in its entirety.

To resolve complex nanoscale structures by localization-based methods, the sample is labeled with photo-sensitive probes, such as photo-activatable ("PA") fluorescent probes (e.g., PA proteins or caged organic dyes). Activation of only a sparse subset of molecules at a time allows their separate localization. By repeated bleaching or deactivation of the active molecules in concert with activation of other inactive probe molecules, a large fraction of the whole probe ensemble can be localized over time. The final sub-diffraction image of the labeled structure is generated by plotting the positions of some or all localized molecules.

Based on the rapid development in both RESOLFT and localization-based techniques, the impact of super-resolution far-field fluorescence microscopy on the biological sciences is expected to increase significantly. Within 2007 alone sub-diffraction multi-color imaging has been reported for the first time for STED microscopy, PALMIRA, STORM, and FPALM has successfully been demonstrated in live cells. Some of these reports are included in an article titled "Two-Color Far-Field Fluorescence Nanoscopy" by Gerald Donnert et al. (Biophysical Journal, L67-L69, Feb. 6, 2007), in an article by M. Bates, B. Huang, G. T. Dempsey, and X. Zhuang (Science 317, 1749-1753, 2007), and in an article titled "Dynamic Clustered Distribution of Hemagglutinin Resolved at 40 nanometers in Living Cell Membranes Discriminates Between Raft Theories" by Samuel T. Hess et al. (Proc. Natl. Acad. Sci. USA 104, 17370-17375, Oct. 30, 2007), each of which is incorporated herein by reference in its entirety.

However, the slow progress in 3D super-resolution imaging has limited the application of these techniques to two-dimensional ("2D") imaging. The best 3D resolution until recently had been 100 nanometers axially at conventional lateral resolution. Achieved by the combination of two objective lens apertures in 4Pi microscopy, it has been applied for more than a decade. This is described in more detail in an article titled "H2AX Chromatin Structures and Their Response to DNA Damage Revealed by 4Pi Microscopy" by Joerg Bewersdorf et al. (Proc. Natl. Acad. Sci. USA 103, 18137-18142, Nov. 28, 2006), which is incorporated by reference in its entirety. Only lately first 3D STED microscopy images have been published exceeding this resolution moderately with 139 nanometer lateral and 170 nanometer axial resolution. These images are presented in more detail in an article by K. I. Willig, B. Harke, R. Medda, and S. W. Hell (Nat. Methods 4, 915-918, 2007), which is incorporated by reference in its entirety. While this represents a ~10-fold smaller resolvable volume than provided by conventional microscopy, it is still at least 10-fold larger than a large number of sub-cellular components, for example synaptic vesicles. Recently, an article (Huang et al., Science 2008) has reported first 3D STORM of thin optical sections (<600 nanometers) with sub-100 nanometer 3D resolution under reducing (low oxygen) conditions.

Moreover, current understanding of fundamental biological processes on the nanoscale (e.g., neural network formation, chromatin organization) is limited because these processes cannot be visualized at the necessary sub-millisecond time resolution. Current biological research at the sub-cellular level is constrained by the limits of spatial and temporal resolution in fluorescence microscopy. The diameter of most organelles is below the diffraction limit of light, limiting spatial resolution and concealing sub-structure. Recent developments (e.g., STED, FPALM, STORM, etc.) have dramatically enhanced the spatial resolution and even overcome the traditional diffraction barrier. However, comparable improvements in temporal resolution are still needed.

Particle-tracking techniques can localize small objects (typically<diffraction limit) in live cells with sub-diffraction accuracy and track their movement over time. But conventional particle-tracking fluorescence microscopy cannot temporally resolve interactions of organelles, molecular machines, or even single proteins, which typically happen within milliseconds.

The spatial localization accuracy of single particles in a fluorescence microscope is approximately proportional to $d1 \sqrt{N}$ (d=spatial resolution; N=total number of detected fluorescence photons from the particle) in the absence of background and effects due to finite pixel size. For longer acquisition times more signal can be accumulated, hence increased temporal resolution requires a trade-off of decreased spatial localization accuracy. For bright organelles containing a few hundred fluorescent molecules, (or future fluorescent molecules with increased brightness), sufficient signal can be accumulated quickly. However, especially for 3D localization where data acquisition is far more complicated than in 2D, technical constraints arising from axial scanning and/or camera readout times limit the recording speed, and therefore, the temporal resolution.

For example, a particular 3D particle-tracking technique can track particles only with 32 milliseconds time resolution. This technique scans a 2-photon excitation focus in a 3D orbit around the fluorescent particle and determines its 3D position by analyzing the temporal fluorescence fluctuations. The temporal resolution is ultimately limited by the frequency with which the focus can revolve in 3D around the particle. This technique is described in more detail in an article titled "3-D Particle Tracking In A Two-Photon Microscope: Application To The Study Of Molecular Dynamics IN Cells" by V. Levi, Q. Ruan, and E. Gratton (Biophys. J., 2005, 88(4): pp. 2919-28), which is incorporated by reference in its entirety.

In another example, another current 3D particle-tracking technique combines traditional particle-tracking with widefield "bifocal detection" images. Particles are simultaneously detected in one plane close to the focal plane of the particle and a second plane 1 micrometer out of focus. The lateral and axial coordinates are derived from the 2 images. In accordance with this technique, the temporal resolution is limited to the 2-50 milliseconds range, and the localization accuracy is limited to the 2-5 nanometer range. Additional details are described in an article titled "Three-Dimensional Particle Tracking Via Bifocal Imaging" by E Toprak el al. (Nano Lett., 2007, 7(7): pp. 2043-45), which is incorporated by reference in its entirety. As such, advances in temporal resolution to sub-millisecond levels have been limited only to 2D imaging.

Thus, there is a need for a microscopy system that can provide 3D imaging with resolution below 100 nanometers in all three dimensions. Another need is directed to achieving particle-tracking in 3D with a temporal resolution below 1 millisecond for enabling visualization of dynamic sub-cellular processes. The present invention is directed to satisfying one or more of these needs and solving other problems.

SUMMARY OF THE INVENTION

According to one embodiment, a microscopy system is configured for creating 3D images from individually localized probe molecules. The microscopy system includes a sample stage, an activation light source, a readout light source, a beam splitting device, at least one camera, and a controller. The activation light source activates probes of at least one probe subset of photo-sensitive luminescent probes, and the readout light source causes luminescence light from the activated probes. Optionally, the activation light source and the readout light source is the same light source. The beam splitting device splits the luminescence light into at least two paths to create at least two detection planes that correspond to the same or different number of object planes of the sample. The camera detects simultaneously the at least two detection planes, the number of object planes being represented in the camera by the same number of recorded regions of interest. The controller is programmable to combine a signal from the regions of interest into a 3D data set.

According to another embodiment, a method for creating 3D images from individually localized probe molecules includes mounting a sample on a sample stage, the sample having a plurality of photo-sensitive luminescent probes. In response to illuminating the sample with an activation light, probes of at least one probe subset of the plurality of photo-sensitive luminescent probes are activated. In response to illuminating the sample with a readout light, luminescence light from the activated probes is caused. The luminescence lights is split into at least two paths to create at least two detection planes, the at least two detection planes corresponding to the same or different object planes in the sample. At least two detection planes are detected via a camera. The object planes are recorded in corresponding recorded regions of interest in the camera. A signal from the regions of interest is combined into a 3D data stack.

According to yet another embodiment, a microscopy system is configured for tracking microscopic particles in 3D. The system includes a sample, a sample stage, at least one light source, a beam-steering device, a beam splitting device, at least one camera, and a controller. The sample, which includes luminescence particles, is mounted to the sample stage. The light source is configured to illuminate an area of the sample to cause luminescence light, primarily, from one tracked particle of the luminescence particles. The beam-steering device is configured to selectively move a light beam to illuminate different areas of the sample such that the luminescence light is detected. The beam splitting device, which is located in a detection light path, splits the luminescence light into at least two paths to create at least two detection planes that correspond to different object planes in the sample.

The camera is positioned to detect simultaneously the at least two detection planes, the number of object planes being represented in the camera by the same number of recorded regions of interest. The controller is programmable to combine a signal from the recorded regions of interest, determine a 3D trajectory of the particle at each time point of a recorded data sequence, and move the beam-steering device to illuminate the different areas of the sample in accordance with corresponding positions of the one tracked particle.

According to yet another embodiment, a method for tracking microscopic particles in 3D includes mounting a sample on a sample stage, the sample including luminescent particles. A small area of the sample is illuminated to cause luminescence light from primarily one particle of the luminescent particles. The light beam is selectively moved to illuminate different areas of the sample to track movement of the one particle, the different areas including the small area of the sample and corresponding to respective positions of the one particle. The luminescence light is split into at least two paths to create at least two detection planes that correspond to the same or different number of object planes in the sample. The at least two detection planes are detected simultaneously. The number of object planes is represented in a camera by the same number of recorded regions of interest. Based on a combined signal from the recorded regions of interest, a 3D trajectory of the one particle is determined at each time point of a recorded data sequence.

Additional aspects of the invention will be apparent to those of ordinary skill in the art in view of the detailed description of various embodiments, which is made with reference to the drawings, a brief description of which is provided below.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
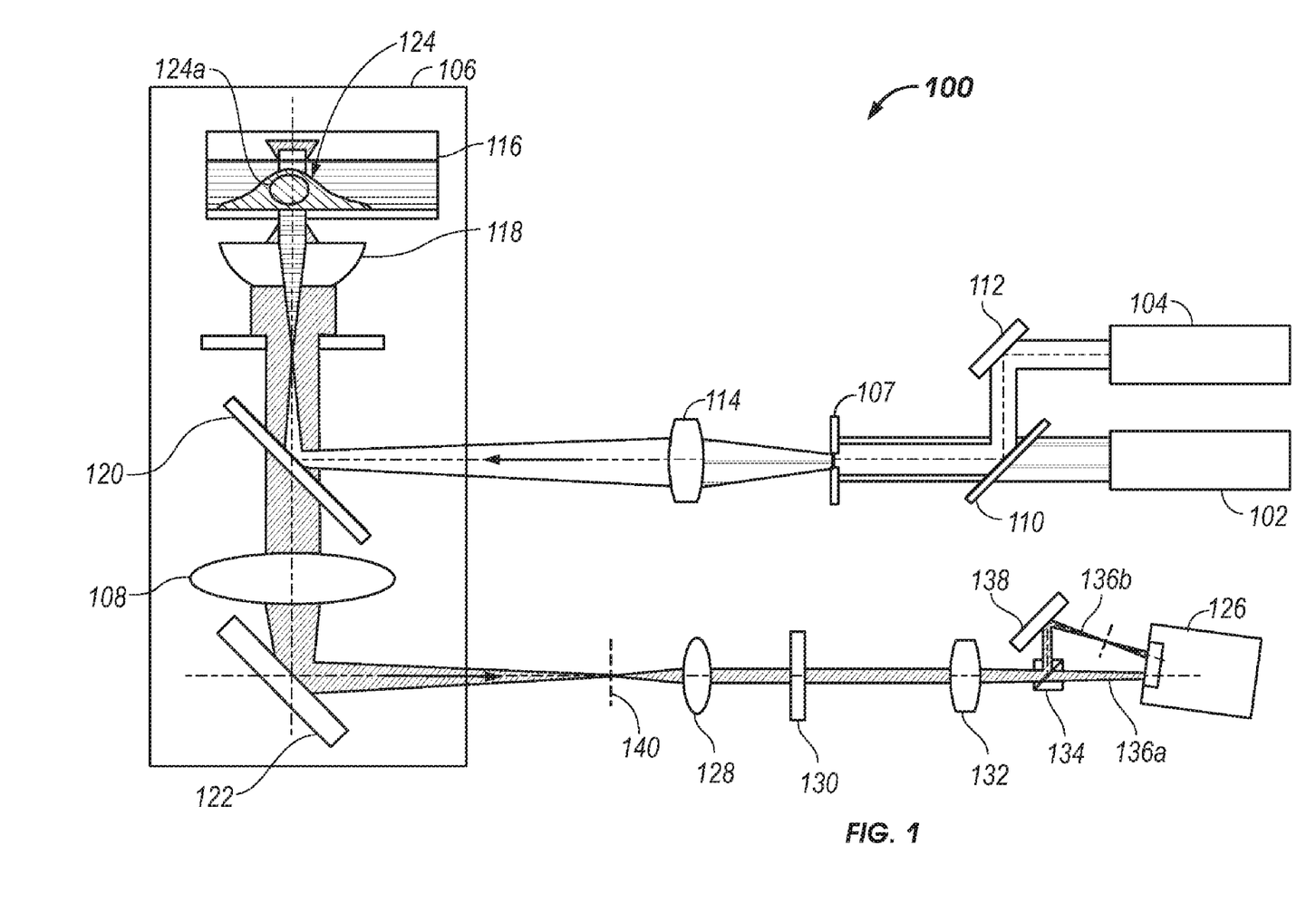
FIG. 1 is a schematic view illustrating a biplane microscope setup for Fluorescence Photoactivation Localization Microscopy (FPALM), according to one embodiment.

Referring to FIG. 1, a biplane ("BP") microscope system 100 allows 3D imaging at an unmatched resolution well below 100 nanometers in all three dimensions, resulting in at least a 100-fold smaller resolvable volume than obtainable by conventional 3D microscopy. The BP microscope system 100 is optionally a BP FPALM system, which is generally based on a conventional FPALM design. However, in contrast to conventional FPALM design, the BP microscope system 100 includes a modified detection path that allows the simultaneous detection from two focal planes. The simultaneous detection of two planes for localization-based super-resolution microscopy speeds up the imaging process by making axial scanning unnecessary, and more importantly, in contrast to scanning-based systems, eliminates localization artifacts caused by abrupt blinking and bleaching common to single molecules. The BP microscope system 100 can optionally be located on an air-damped optical table to minimize vibrations.

In addition to achieving 3D particle localization down to the nanometer range accuracy, the BP microscope system 100 can also achieve temporal resolution <1 milliseconds. As such, in addition to being a BP FPALM system, the BP microscope system 100 can also be a next-generation 3D particle-tracking microscope ("3D PTM") for providing unprecedented temporal and spatial resolution when tracking fluorescent particles in live cells in 3D. FPALM and particle-tracking are just some exemplary applications of the BP microscope system 100. To achieve unprecedented temporal resolution at least as short as 0.3 milliseconds, the BP microscope system 100 tracks one particle at a time (in contrast to conventional 2D and 3D tracking techniques that visualize the entire field). Additionally, the BP microscope system 100 can include a detection scheme without any moving parts that detects simultaneously two axially shifted detection planes.

In contrast to current PTM techniques, the BP microscope system 100 can include a focused laser beam for excitation combined with spatially limited detection. Background light is filtered out to avoid localization disturbances and to increase sensitivity in samples thicker than about 1 micrometer. This enables particle-tracking even in tissue sections. To follow a particular particle over several microns in 3D, the BP microscope system 100 can include, for example, high-speed piezo-mirrors and a fast piezo-driven sample stage. The combination of focused excitation and feedback-driven beam-tracking reduces the background and enhances the speed limit by approximately one order of magnitude. Optionally, a second (different) luminescence color can be detected to enable correlative studies of the movement of the tracked particle.

Illumination for readout and activation can be provided by a readout laser 102, operating typically at 496 nanometers, and an activation laser 104 (e.g., 50 mW, Crystalaser), operating typically at 405 nanometers. The readout laser 102 is optionally a water-cooled Argon laser (e.g., Innova 70, coherent Inc.) that can provide 458, 472, 488, 496, or 514 nanometers for readout illumination. Optionally, the wavelength of the readout laser 102 is selected to minimize activation of inactive probes of a plurality of photo-sensitive probes of a sample 124. Optionally yet, the readout laser 102 and the activation laser 104 can be the same source. For example, the readout laser 102 can perform both the readout functions and the activation functions, without requiring the use of the activation laser 104. According to one embodiment, at least one illuminated area of the sample 124 is a relatively small area, having, for example, a general diameter that is less than about three times an Airy disk diameter.

Both lasers 102, 104 are combined, via a first dichroic beam splitter 110, and coupled, via a second dichroic beam splitter 120, into a microscope stand 106 equipped with a 63× 1.2NA water immersion tube lens 108 after passing through a field aperture 107. Both lasers 102, 104 can be switched on and off by software-controlled electrical shutters (e.g., SH05, Thorlabs). Other components that may be included along the path between the lasers 102, 104 and the microscope stand 106 are a first mirror 112 and a first lens 114.

The microscope stand 106 can have a plurality of components, including a sample stage 116 and an objective 118. The sample 124, including for example a biological cell 124a is generally positioned on the sample stage 116. The sample stage 116 can be a mechanical stage or a three-axis piezo stage (e.g., P-733.3DD, Physik Instrumente). Other components, which are not shown, may include shutters in front of the lasers 102, 104 and further optics for folding the beam path.

Fluorescence is collected by the objective 118, passes through a second dichroic beam splitter 120 (which reflects the laser light) and is focused by the tube lens 108 via an optional second mirror 122 (e.g., a piezo-driven mirror) into an intermediate focal plane 140. The focal plane 140 is imaged by two lenses—a second lens 128 and a third lens 132—onto a high-sensitivity EM-CCD camera 126 (e.g., DU897DCS-BV iXon, Andor Technology). Scattered laser light is attenuated by bandpass and Raman edge filters (e.g., Chroma and Semrock), such as filter 130.

The detection scheme can be achieved by moving the CCD camera 126 out of the standard image plane closer to the tube lens 108 and thereby shifting the corresponding focal plane ~350 nanometers deeper into the sample. A beam splitter cube 134 is placed into a focused light path 136a in front of the CCD camera 126. The beam splitter cube 134 redirects a reflected light path 136b via a third mirror 138 towards the CCD camera 126 to form a second image in a different region of the same CCD. Due to the longer optical path, this second image corresponds to a focal plane ~350 nanometers closer to the objective 118 than the original focal plane.

The BP microscope system 100, using a single camera, is straightforward to implement and avoids synchronization problems between separate cameras. The BP microscope system 100 features a reasonable field of view of ~20×50 micrometers$^2$ (pixel size corresponding to ~100 nanometers in the sample 124; 512×512 pixels), sufficient to image large portions of a cell. The BP microscope system 100 is able to image 100 frames per second with a field of view of 10 to 20 micrometers in length and 2×2 binning. The use of the CCD camera 126, which features negligible readout noise due to its on-chip electron multiplication, avoids additional noise that would otherwise result from splitting the light up into two fields as required for BP detection. Combined with the fact that there is minimal loss of fluorescence detection efficiency, this exemplary BP microscope system 100 expands conventional FPALM to 3D imaging without significant drawbacks.

BP FPALM technology is compatible with live cell imaging and can be expanded to multicolor imaging (even realizable on the same CCD detector). BP FPALM can record 3D structures in a ~1 micrometer thick z-section without scanning. Larger volumes can be recorded by recording BP FPALM data at different sample positions. To minimize activation of out of focus PA molecules, BP FPALM can be combined with a 2-photon ("2P") laser scanner. 2P excitation-mediated activation is directed to diffraction-limited planes of ~800 nanometers thickness, a thickness that is compatible with the axial detection range of BP FPALM. BP FPALM therefore has the potential of imaging specimens such as cell nuclei or tissue sections far exceeding 1 micrometer in thickness.

Moreover, combined with or without 2P excitation, BP FPALM can be readily implemented in practically every existing FPALM, PALM, PALMIRA or STORM instrument. BP FPALM therefore provides the means to investigate a large variety of biological 3D structures at resolution levels previously far out of reach.

Optionally, BP FPALM detected luminescence from activated probes is fluorescence or scattered light. In an alternative embodiment, the activation of activated probes is achieved via a non-linear process that limits the activation to a plane of diffraction-limited thickness.

For PSF measurement, according to one example, 100 nanometer diameter yellow-green fluorescent beads (Invitrogen, F-8803) can be attached to a poly-L-lysine coated cover slip. The sample can be mounted on a piezo stage and imaged in the BP FPALM setup with 496 nm excitation. Typically, 101 images at z-positions ranging from −2.5 to +2.5 micrometers with 50 nanometers step size are recorded. The same bead is imaged 2 to 3 times to check for drift and to correct for bleaching. To reduce noise, the data set can be smoothed in Imspector with a Gaussian filter of sub-diffraction size. Additionally, the data set can be corrected for mono-exponential bleaching, cropped to appropriate size and to be centered and normalized to 1.

Use of two focal planes for z-position determination is generally sufficient for particle localization under the constraints that (1) a sparse distribution of particles is analyzed (no overlapping signal within the size of one PSF) and (2) the axial position of the particle is close to one of the detection planes or lies between them. For example, to evaluate the range and accuracy of z-localization, 40 nanometers diameter fluorescent beads (FluoSpheres, F8795, Invitrogen) were imaged on a cover slip over 1,000 frames. A piezo-driven sample stage was moved by one 100 nanometers z-step every 100 frames. Localization analysis of the BP images reproduced that z-movement very accurately with σ≈6 to 10 nanometers axial localization accuracy. The beads could be localized over a range of 800 nanometers exceeding the distance between the two detection planes (in this case 500 nanometers) by more than 50%.

In one example, the accumulation time per frame is typically 10 milliseconds. In this example, electron multiplying gain is set to 300, the readout is 2×2 binned, only the region occupied by two recorded regions of interest ("ROIs") is read out, and, typically, 5,000 to 50,000 frames are recorded.

Optionally, at least some of the ROIs are detected at different wavelengths by including suitable detection filters in the BP microscope system 100. In alternative embodiments, at least some of the ROIs are detected at different polarization directions by including suitable polarization optics in the BP microscopy system 100.

Figure 2:
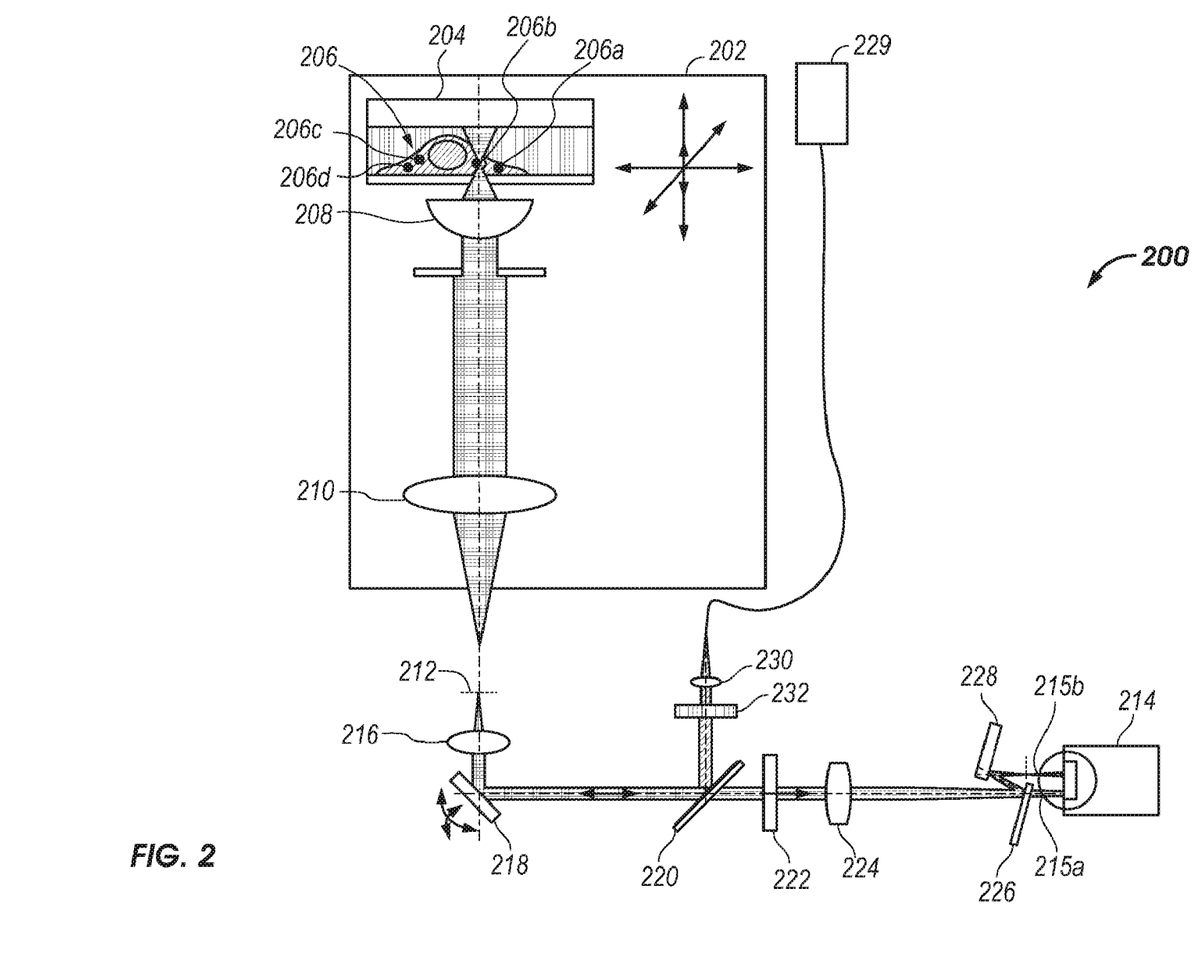
FIG. 2 is a schematic view illustrating a biplane microscope setup, according to an alternative embodiment.

Referring to FIG. 2, a BP microscope system 200 is shown according to an alternative embodiment. The BP microscope system 200 includes a microscope stand 202 having a piezo-driven sample stage 204 on which a sample 206 is positioned. The sample 206 includes a plurality of fluorescent particles 206a-206d. The microscope stand 202 further includes an objective 208 and a first lens 210.

Additional components are positioned between a focal plane 212 and the CCD camera 214 along a fluorescence light path 215. Specifically, the components include a second lens 216, a beam-steering device 281 (e.g., a piezo-driven mirror), a dichroic beam splitter 220, a bandpass filter 222, a third lens 224, a neutral 50:50 beam splitter 226, and a mirror 228. Optionally, the beam-steering device 218 can include generally a focusing optical element that moves illumination and detection focal planes axially to follow the tracked particle. In yet another example, the beam-steering device 218 can include a phase-modulating device that moves an illuminated area laterally and illumination and detection focal planes axially to follow the tracked particle. Optionally yet, more than one piezo-driven mirror 218 can be included in the BP microscope system 200.

A polarized laser beam from a laser 229 is coupled into the microscope stand 202 and focused into the sample 206 by the objective 208. A fourth lens 230 and a λ/4 plate 232 are positioned between the laser 229 and the dichroic beam splitter 220.

The focus can be positioned in the region of interest by moving the sample stage 204 and the beam-steering device 218. The fluorescence emerging from the focal region is collected by the objective 208 and is imaged onto the CCD camera 214 via the first lens 210, the second lens 216, and the third lens 224. The dichroic beam splitter 220 and the bandpass filter 222 filter out scattered excitation light and other background light.

The neutral 50:50 beam splitter 226 splits the fluorescence light into two beam paths, a transmitted beam 215a and a reflected beam 215b. The transmitted beam 215a images light emitted from a plane deeper in the sample onto one area of the CCD chip. The reflected beam 215b images light from a plane closer to the objective onto another well-separated area to avoid cross-talk.

Figure 3:
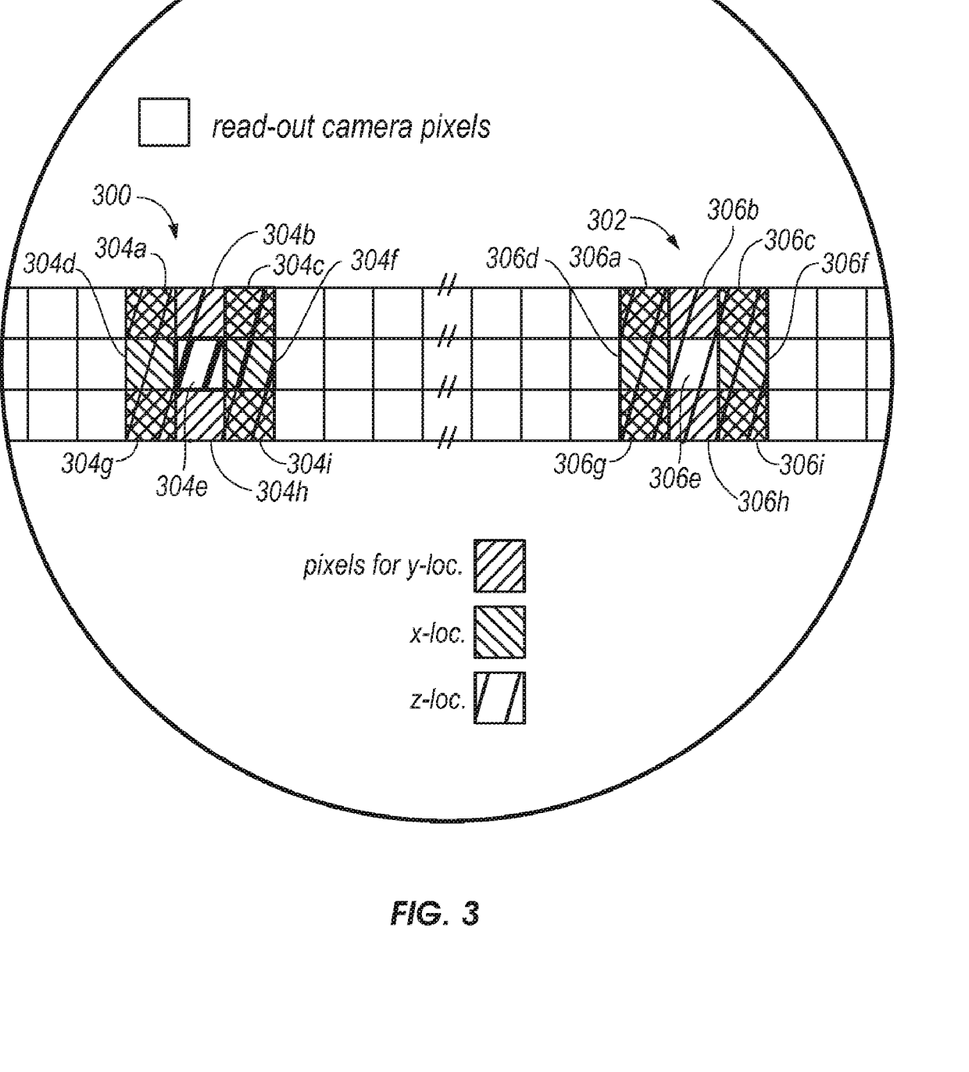
FIG. 3 is a schematic view illustrating a fluorescent particle image on a CCD chip.

Referring to FIG. 3, two ROIs on the CCD chip represent two focal planes in the sample 206 (illustrated in FIG. 2), typically 700 nanometers apart, arranged like wings of a biplane. The two ROIs include a transmitted ROI 300 and a reflected ROI 302, each having nine pixels showing an image of the fluorescent particle 206b from the sample 206. The dashed areas 304a-304i, 306a-306i depict the pixels that are used for tracking the fluorescent particle 206b. Thus, the two 9-pixel-areas 304a-304i, 306a-306i represent in general the position of the particle 206b in 3D.

The fluorescent particle 206b, which is generally smaller than the laser focus and located in the focal region, is excited homogeneously and 3 (binned) lines (i.e., the two 9-pixel-areas represented by dashed areas 304a-304i, 306a-306i) of the CCD chip arranged around the laser focus image are read out at every time point. Particles laterally shifted with respect to the laser focus center will appear shifted on the CCD chip. For the z direction, the two 9-pixel-areas 304a-304i, 306a-306i act in the same was as two confocal pinholes in different planes: if the particle 206b moves axially, the signal will increase in one of the 9-pixel-area and decrease in the other 9-pixel-area. An axial shift will be represented by a sharper intensity distribution in one of the two 9-pixel-areas depending on the direction of the shift.

The 3D position can be determined by subtracting different pixel values of the two 9-pixel-areas from each other. For the axial coordinate (z-axis), the sum of all pixels from one 9-pixel-area can be subtracted from the other 9-pixel-area. The fact that the lateral information is preserved in the 9-pixel-areas allows for lateral localization of the particle 306b at the same time. For the lateral x-axis (or y-axis) direction, the signal collected in the left columns 304a, 304d, 304g, 306a, 306d, 306g (or upper rows: 304a, 304b, 304c and 306a, 306b, 306c) of both 9-pixel-areas 300 and 302 can be subtracted from the one in the right columns 304c, 304f, 304i, 306c, 306f, 306i (or lower rows: 304g, 304h, 304i and 306g, 306h, 306i). Calculations show that the determined values are approximately proportional to the particle position offset of the center as long as the position stays in a range of +/−250 nanometers axially and +/−100 nanometers laterally. In a simple feedback loop, these values can be fed back to piezo controllers tilting piezo mirrors and moving the sample stage piezo to re-center the particle in the 9-pixel-areas after every measurement. Optionally, for larger movements up to about double the linear ranges, the position can be determined by taking the image shape and brightness into account in the data analysis to increase the tracking range.

According to an alternative embodiment, the pixels of the transmitted ROI 300 (on the left) show a brighter image than the pixels of the reflected ROI 302 (on the right). For example, the top-right dashed areas 304b, 304c, 304e, 304f of the transmitted ROI 300 are generally brighter than the other 5 pixels in the same ROI 300 and than all pixels of the reflected ROI 302 As such, the fluorescent particle 206b is located axially more towards the focal plane 140 imaged on transmitted ROI 300 and is shifted by about half the diffraction limit toward the right and top relative to the excitation focus.

The signal from the two ROIs 300, 302 can also be combined into a 3D data stack (2 pixels in z; x and y dimensions are determined by the size of the ROIs 300, 302). Data analysis is a generalization of standard FPALM methods to 3D. Instead of a Gaussian, an experimentally obtained 3D-PSF can be fit to each data set consisting of the pixels around each detected probe molecule. The x, y and z-coordinates of each molecule are determined from the best fit of the molecule image with the PSF.

For BP FPALM, typically but not necessarily, larger ROIs 300, 302 are used to allow localization of particles over a larger field of view. Also, several particles can be present in the same ROI and still be analyzed separately. Slight variations in the magnification and rotation between the two detection areas may be corrected by software before combination of the two ROIs 300, 302 into a 3D data stack. The slight difference in the tilt of the focal planes between the two ROIs 300, 302 is negligible because of the large axial magnification (proportional to the lateral magnification squared). The analysis of the 3D data can be seen as the generalization of standard 2D FPALM analysis to 3D. Particles are identified in the z-projected images by iteratively searching for the brightest pixels and eliminating this region in the subsequent search until a lower intensity threshold has been reached. The raw data may be cut out in each ROI 300, 302 around each found particle in a square window of, for example, 10-19 pixels long and wide. Instead of a 2D Gaussian, a theoretical or experimentally obtained 3D-PSF can be fitted to the data sets in this cutout window using a simplex fitting algorithm adapted from Numerical Recipes in C, or a different algorithm. From the resulting best fitting x, y and z-coordinates, the localized position is extracted and stored. Additionally, amplitude, background, the deviation from the cutout windows center, the number of iterations and the chi square value are stored, which allow later determination of the quality of the fit. The stored list of fit results is analyzed and translated into 3D data sets of customizable voxel sizes. The fit amplitude is used as the voxel intensity for every molecule found that fulfills the user-defined quality criteria. For operation without the piezo stage, the camera software (Solis, Andor Technology) is used for data recording. Software to operate the microscope with the piezo stage, for fitting, and to create 3D data sets, may be programmed in LabView 8.2 (National Instruments). Inspector (Andreas Schoenle, Max Planck Institute for Biophysical Chemistry, Goettingen, Germany) is used for display and analysis of 3D data sets. 3D rendered images may be created using Amira.

Figures 4A, 4B:
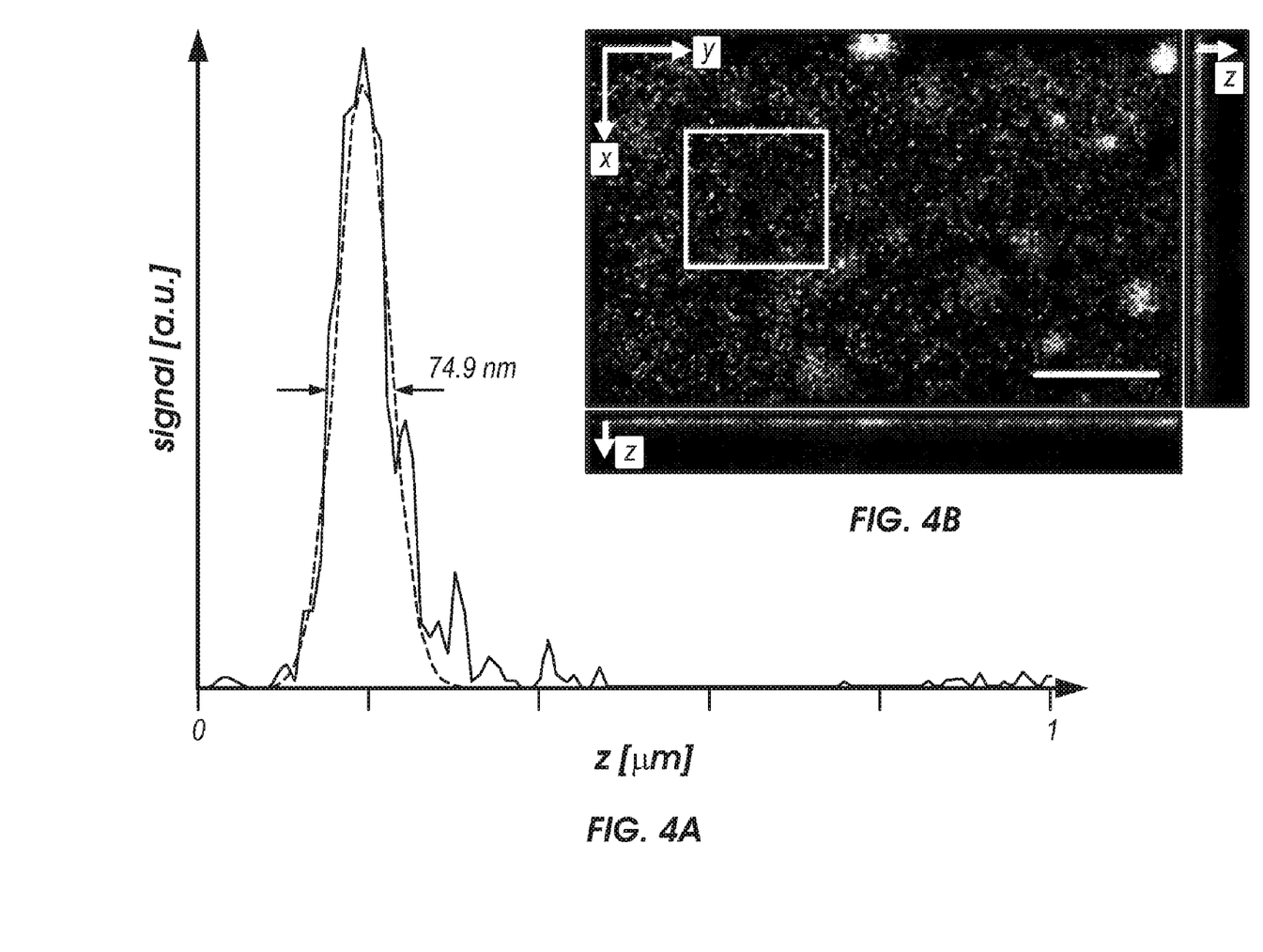
FIG. 4A is a graph representing an axial resolution measured from an axial profile of caged fluorescein-labeled antibodies.
FIG. 4B is a representative image showing added-up projections of a data set in three different orientations for the axial resolution measured in FIG. 4A.

Referring to FIG. 4A, a graph illustrates the axial resolution measured using a BP FPALM setup. Specifically, the axial resolution is measured from an axial profile of caged fluorescein-labeled antibodies on a covers slip and embedded in 87% glycerol. The black line represents raw data and the dashed line represents a Gaussian fit.

From the axial profile, a full-width-at-half-maximum ("FWHM") distribution of 75 nanometers is measured, which is about 10-fold below the axial FWHM of measured PSF (which represents the axial resolution of conventional diffraction-limited microscopy). Since localization-based resolution is proportional to the diffraction-limited PSF size and the axial FWHM of a widefield 1.2NA PSF is ~250% larger than the lateral FWHM, the measured z-localization precision is consistent with x and y-resolution of 20 to 40 nanometers previously obtained in FPALM and PALM.

Referring to FIG. 4B, an inset shows added-up projections of the data set (of FIG. 4A) in three different orientations. The white box marks the region used to generate the axial profile. The scale bar of the original images was 2 micrometers.

Referring to FIGS. 5A-5E, 3D BP FPALM imaging of 2 micrometers diameter beads labeled with caged fluorescein shows data sets at different axial positions. Specifically, representative 100 nanometer thick xy images of the resulting data set are illustrated at z=+300 nanometers, +100 nanometers, −100 nanometers, −300 nanometers, and −500 nanometers, respectively. The data shown in all planes 5A-5F is recorded simultaneously without scanning. Especially to image samples thicker than 1 micrometer, the sample stage can be moved after finishing recording at one sample position to access different sample depth positions and the data recording process is repeated until all sample positions of interest have been recorded.

Figure 5A:
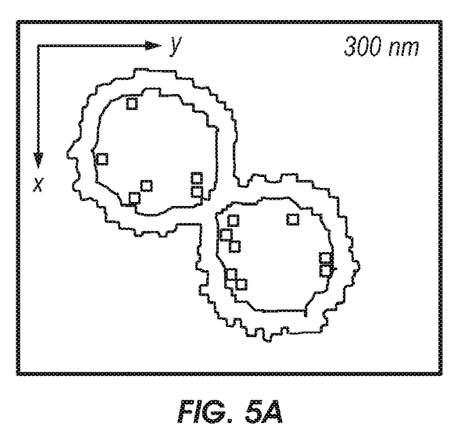
FIG. 5A is a representative image of a data set for beads labeled with caged fluorescein at an axial position of 300 nanometers.
Figure 5B:
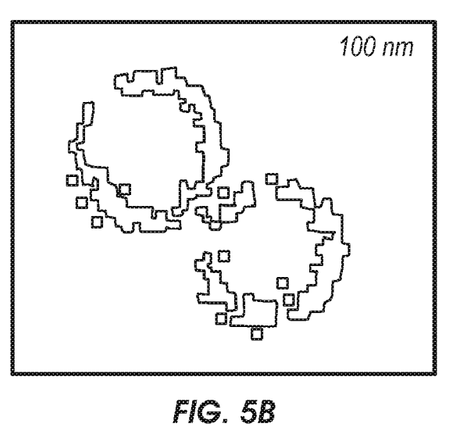
FIG. 5B illustrates a representative image of a resulting data set for the beads of FIG. 5A at an axial position of 100 nanometers.
Figure 5C:
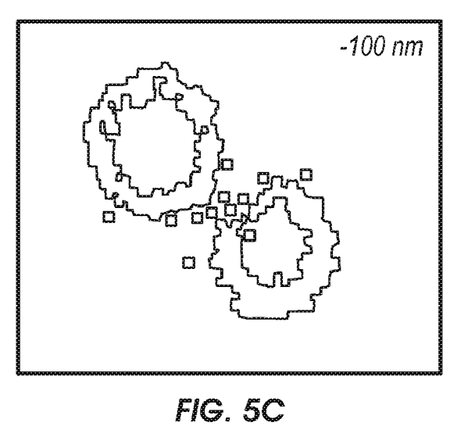
FIG. 5C illustrates a representative image of a resulting data set for the beads of FIG. 5A at an axial position of –100 nanometers.
Figure 5D:
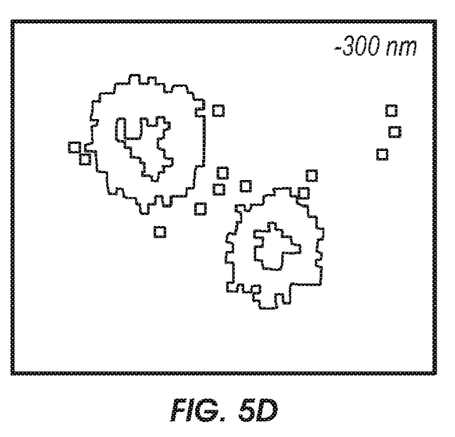
FIG. 5D illustrates a representative image of a resulting data set for the beads of FIG. 5A at an axial position of –300 nanometers.
Figure 5E:
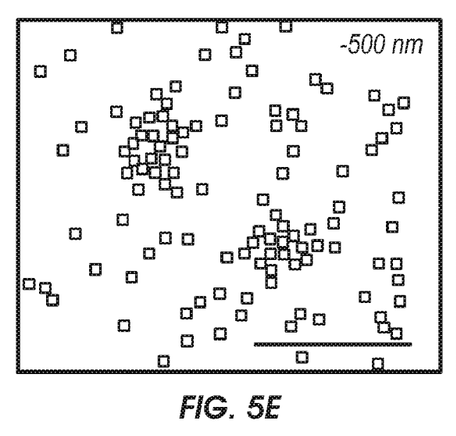
FIG. 5E illustrates a representative image of a resulting data set for the beads of FIG. 5A at an axial position of –500 nanometers.
Figure 5F:
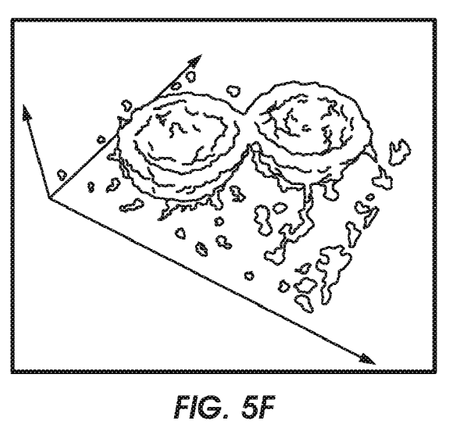
FIG. 5F illustrates a volume-rendered representation of the data set illustrated in FIGS. 5A-5E.

Referring to FIG. 5F, a volume-rendered representation is shown based on the data sets of FIGS. 5A-5E. The curved surface of the bead is nicely reproduced over nearly 1 µm in depth without scanning. The optical images show well-below 100 nanometers resolution in all three dimensions. With approximately 30×30×80 nanometers$^3$, the resolvable volume is ~500-fold below the diffraction-limited observation volume and represents the smallest observation volume achieved in a far-field light microscope.

Figure 6:
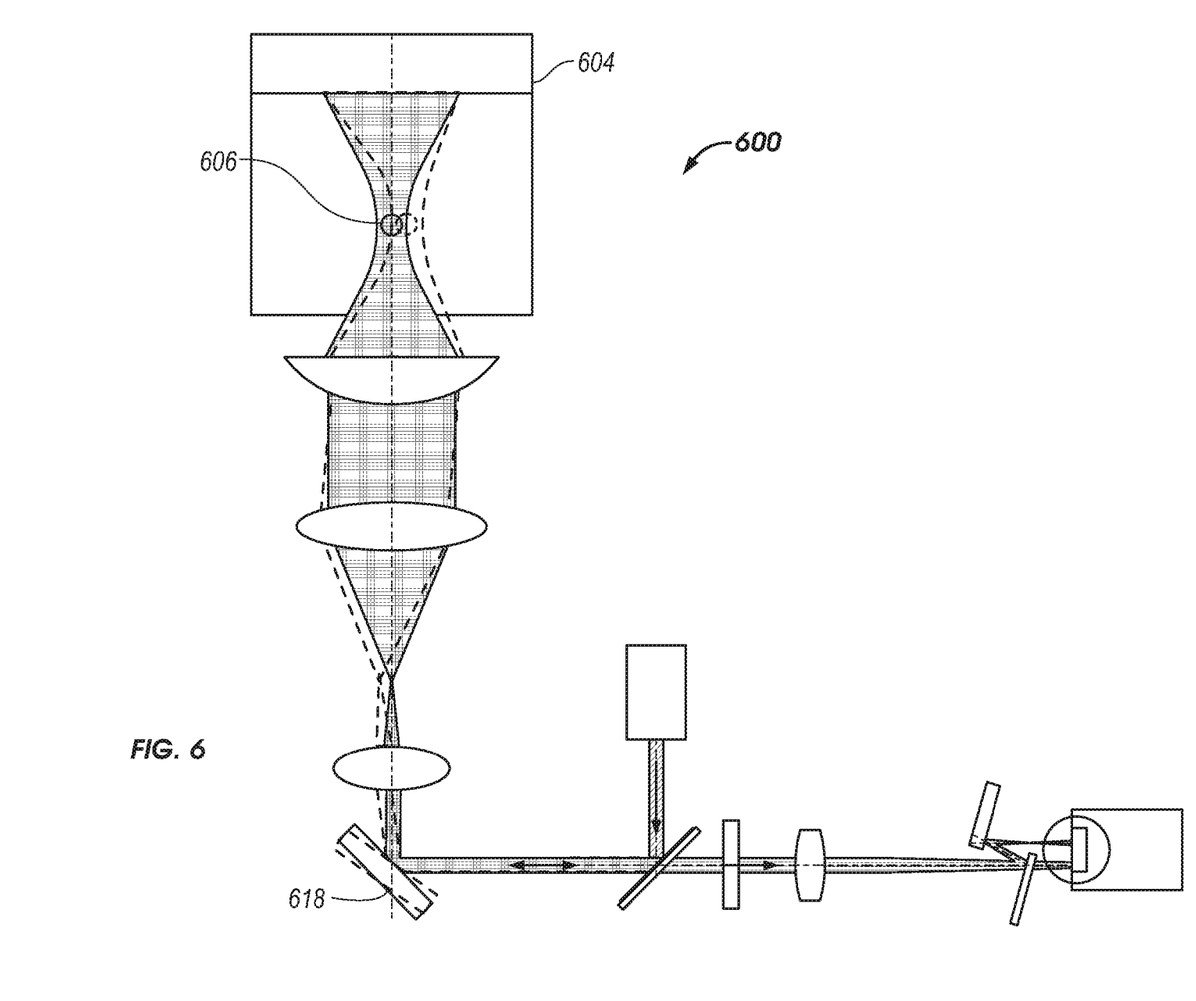
FIG. 6 is a schematic view illustrating adjustment of a biplane microscope setup, according to an alternative embodiment.

Referring to FIG. 6, a BP microscope system 600 is illustrated to show the tracking of a single particle 606 positioned on a sample stage 604. The BP microscope system 600 is generally similar to the BP microscope system 300 described above in reference to FIG. 3.

As the single particle 606 moves relatively to the sample stage 604 from a first position (indicated in solid line) to a second position (indicated in dashed line), the fluorescence light beam is adjusted by tilting one or more piezo-mounted mirrors or adjusting alternative beam-steering devices 618. In the exemplary scenario, the piezo-mounted mirror 618 is tilted counterclockwise from a first position (indicated in solid line) to a second position (indicated in dashed line). The rotation of the mirror 618 steers the fluorescence light beam on the camera as well as the excitation light beam focusing into the sample and coming from the laser to correct for sideways movement of the particle 606. The mirror 618 is rotated until the excitation light beam is again centered on the particle 606.

Optionally, the sample stage 604 is moved up or down to correct for vertical movement. Alternatively, a suitable beam-steering device 618 refocuses the beam vertically. After the necessary adjustments are made to track the particle 606, the positions of the piezo and stage are recorded to reconstruct large scale movement in post-processing.

Figure 7A:
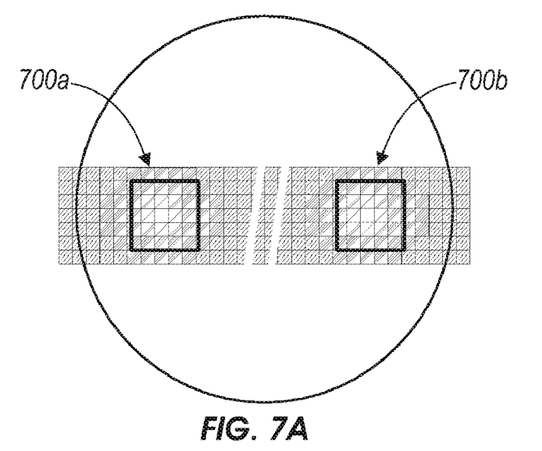
FIG. 7A is a schematic view illustrating a fluorescent particle image on a CCD chip when the particle is in focus, in a first position.
Figure 7B:
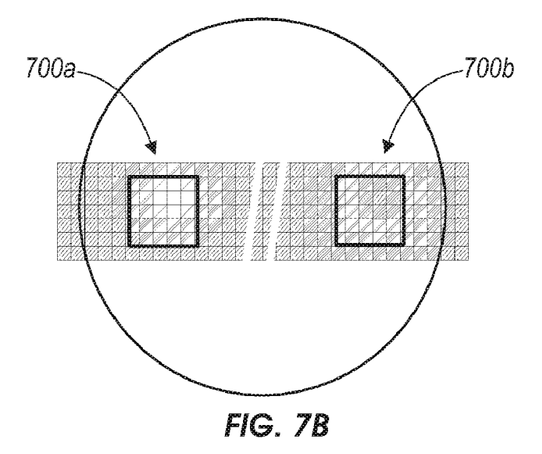
FIG. 7B is a schematic view illustrating the fluorescent particle image of FIG. 7A when the particle is out of focus, in a second position.

Referring to FIGS. 7A and 7B, two insets show the images recorded when a particle moves from a first position to a second position as described above in reference to FIG. 6. In FIG. 7A, a transmitted ROI 700a and a reflected ROI 700b are recorded on a CCD chip when the particle is in the first position. The pixels of the transmitted ROI 700a show the same focus and intensity as the pixels in the reflected ROI 700b. A black box surrounds a general 5×5 pixel area of interest.

When the particle moves to the second position, as shown in FIG. 7B, the transmitted ROI 700a and the reflected ROI 700b change such that the respective pixels in the area of interest are now out of focus and of different intensity. For example, the pixels of the transmitted ROI 700a are now generally brighter (i.e., more intense) than in the first position, and off-center with respect to the area of interest (i.e., up and to the right). Similarly, the pixels of the reflected ROI 700b are now generally less bright (i.e., less intense) than in the first position, and off-center with respect to the area of interest (i.e., up and to the right).

Figure 7C:
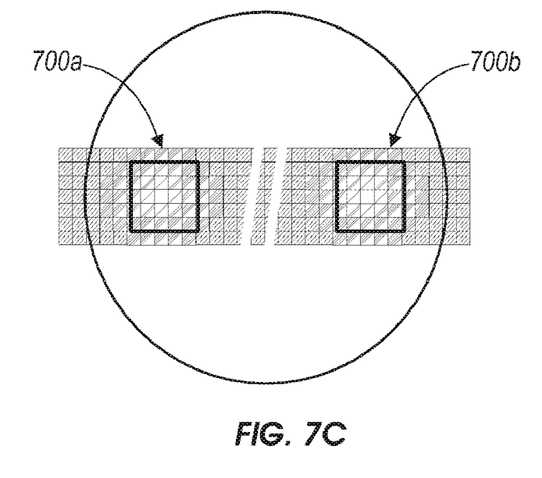
FIG. 7C is a schematic view illustrating the fluorescent particle image of FIG. 7B when the particle is in focus, in a third position.

Referring to FIG. 7C, the fluorescence light beam has now been steered to center it on the particle 606 in the second position. The pixels of the transmitted ROI 700a and of the reflected ROI 700b are generally similar, if not identical, to the pixels illustrated in the first position of the particle 606 (shown in FIG. 7A). Specifically, the pixels are generally centered within the area of interest and are now of similar intensity in both the transmitted ROI 700a and the reflected ROI 700b.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways.

Each of these embodiments and obvious variations thereof is contemplated as falling within the spirit and scope of the claimed invention, which is set forth in the following claims.

What is claimed is:

1. A microscopy system configured for creating 3D images from individually localized probe molecules, the system comprising:

a sample stage for mounting a sample having a plurality of photo-sensitive luminescent probes;

an activation light source configured to illuminate the sample with an activation light, the activation light source being configured to activate probes of at least one probe subset of the plurality of photo-sensitive luminescent probes;

a readout light source configured to illuminate the sample with a readout light, the readout light source being configured to cause luminescence light from the activated probes;

a beam splitting device located in a detection light path that splits the luminescence light into at least two generally parallel paths, the beam splitting device creating at least two detection planes that correspond to the same or different number of object planes of the sample;

a single camera positioned to detect simultaneously the at least two detection planes, the number of object planes being represented in the camera by the same number of recorded regions of interest; and a controller programmable to combine a signal from the regions of interest into a 3D data stack.

2. The microscopy system of claim 1, wherein the sample stage is moveable by the controller to image different object planes in the sample.

3. The microscopy system of claim 1, wherein the detected luminescence from the activated probes is fluorescence.

4. The microscopy system of claim 1, wherein the activation of the activated probes is achieved by a non-linear process limiting the activation to a plane of diffraction-limited thickness.

5. The microscopy system of claim 1, wherein a wavelength of the readout light source is selected to minimize activation of inactive probes of the plurality of photo-sensitive probes.

6. The microscopy system of claim 1, wherein the activation light source and the readout light source is the same.

7. The microscopy system of claim 1, wherein the singe camera is a CCD camera.

8. The microscopy system of claim 1, wherein the recorded regions of interest are arranged on the single camera such that they are separated to avoid cross-talk.

9. The microscopy system of claim 1, wherein at least some of the recorded regions of interest are detected at different wavelengths via suitable detection filters.

10. The microscopy system of claim 1, wherein at least some of the recorded regions of interest are detected at different polarization directions via suitable polarization optics.

11. The microscopy system of claim 1, wherein the activated probes are spatially separated by at least a microscope resolution.

12. A method for creating 3D images from individually localized probe molecules, the method comprising:
(A) mounting a sample on a sample stage, the sample having a plurality of photo-sensitive luminescent probes;
(B) in response to illuminating the sample with an activation light, activating probes of at least one probe subset of the plurality of photo-sensitive luminescent probes;
(C) in response to illuminating the sample with a readout light, causing luminescence light from the activated probes;
(D) splitting the luminescence light into at least two generally parallel paths to create at least two detection planes, the at least two detection planes corresponding to the same or different object planes in the sample;
(E) detecting simultaneously the at least two detection planes via a single camera;
(F) recording the object planes in corresponding recorded regions of interest in the camera; and
(G) combining a signal from the regions of interest into a 3D data stack.

13. The method of claim 12, further comprising moving the sample stage via a controller to image different object planes in the sample.

14. The method of claim 12, further comprising limiting the activating to a plane of diffraction-limited thickness.

15. The method of claim 12, wherein a wavelength of the readout light source is selected to minimize activation of inactive probes of the plurality of photo-sensitive probes.

16. The method of claim 12, further comprising arranging the recorded regions of interest on the single camera such that they are separated to avoid cross-talk.

17. The method of claim 12, further comprising
(H) deactivating the activated probes of the at least one probe subset;
(I) repeating (B)-(G) for at least one more subset of probes of the plurality of photo-sensitive luminescent probes; and
(J) based on localized three-dimensional positions of the activated probes of the at least one probe subset and the at least one more subset of probes, constructing a 3D image of the sample.

* * * * *